US012518586B2

(12) United States Patent
Khosla

(10) Patent No.: US 12,518,586 B2
(45) **Date of Patent: *Jan. 6, 2026**

(54) METHODS OF SIMULATING GAMEPLAY

(71) Applicant: Vinod Khosla, Menlo Park, CA (US)

(72) Inventor: Vinod Khosla, Menlo Park, CA (US)

(73) Assignee: Vinod Khosla, Portola Valley, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/435,484

(22) Filed: Feb. 7, 2024

(65) Prior Publication Data

US 2024/0312287 A1 Sep. 19, 2024

Related U.S. Application Data

(63) Continuation of application No. 17/692,957, filed on Mar. 11, 2022, now Pat. No. 11,928,914, which is a continuation of application No. 16/998,464, filed on Aug. 20, 2020, now Pat. No. 11,308,752, which is a continuation of application No. 16/588,311, filed on Sep. 30, 2019, now Pat. No. 10,789,804, which is a continuation of application No. 15/685,822, filed on Aug. 24, 2017, now Pat. No. 10,467,847.

(60) Provisional application No. 62/379,917, filed on Aug. 26, 2016.

(51) Int. Cl.
*G07F 17/32* (2006.01)

(52) U.S. Cl.
CPC ...... *G07F 17/3211* (2013.01); *G07F 17/3244* (2013.01); *G07F 17/326* (2013.01); *G07F 17/3288* (2013.01)

(58) Field of Classification Search
CPC ............ G07F 17/3211; G07F 17/3244; G07F 17/326; G07F 17/3288; A63F 13/65
USPC .......................................................... 463/31
See application file for complete search history.

(56) References Cited

U.S. PATENT DOCUMENTS

| | | | |
|---|---|---|---|
| 6,080,063 | A | 6/2000 | Khosla |
| 6,616,529 | B1 | 9/2003 | Qian et al. |
| 6,726,567 | B1 | 4/2004 | Khosla |
| 8,096,865 | B2 | 1/2012 | Schugar |
| 8,360,835 | B2 | 1/2013 | Strause et al. |
| 8,454,428 | B2 | 6/2013 | Pacey et al. |
| 10,467,847 | B2 | 11/2019 | Khosla |
| 10,789,804 | B2 | 9/2020 | Khosla |
| 11,308,752 | B2 | 4/2022 | Khosla |
| 2005/0044575 | A1 | 2/2005 | Der |

(Continued)

FOREIGN PATENT DOCUMENTS

| | | |
|---|---|---|
| JP | 2006198072 A | 8/2006 |
| JP | 2008012074 A | 1/2008 |
| WO | WO-2018/039502 | 3/2018 |

OTHER PUBLICATIONS

International Search Report and Written Opinion dated Nov. 2, 2017 for U.S. Patent Application No. PCT/US2017/048502.
Notice of Allowance dated Jun. 8, 2020 for U.S. Appl. No. 16/588,311.
Notice of Allowance dated Sep. 5, 2019 for U.S. Appl. No. 15/685,822.

(Continued)

*Primary Examiner* — Pierre E Elisca
(74) *Attorney, Agent, or Firm* — Wilson Sonsini Goodrich & Rosati

(57) ABSTRACT

The present disclosure describes systems and methods for simulating gameplay of a live event and placing wagers or non-wager submissions concerning an outcome of a simulation. The systems incorporate statistical data, event information, and user modifications to create the simulation.

23 Claims, 6 Drawing Sheets

(56) References Cited

U.S. PATENT DOCUMENTS

| | | | | |
|---|---|---|---|---|
| 2007/0087804 | A1 | 4/2007 | Knowles et al. | |
| 2007/0207846 | A1 | 9/2007 | Burak et al. | |
| 2009/0023489 | A1 | 1/2009 | Toneguzzo | |
| 2009/0093290 | A1 | 4/2009 | Lutnick et al. | |
| 2010/0271367 | A1* | 10/2010 | Vaden | A63F 13/213 348/157 |
| 2013/0324239 | A1 | 12/2013 | Ur et al. | |
| 2014/0038714 | A1 | 2/2014 | Wei | |
| 2014/0221065 | A1* | 8/2014 | Strause | H04L 67/131 463/6 |
| 2018/0158286 | A1 | 6/2018 | Strause et al. | |

OTHER PUBLICATIONS

Office Action and translation issued in Japanese Patent Application No. 2019-531549 on Aug. 25, 2021.
Office Action dated Feb. 14, 2020 for U.S. Appl. No. 16/588,311.
Office Action dated Mar. 7, 2019 for U.S. Appl. No. 15/685,822.
Office Action dated Jul. 26, 2018 for U.S. Appl. No. 15/685,822.
Supplementary European Search Report dated Sep. 9, 2020 for Application Serial No. EP 17 84 4452, (9 pages).
Office Action dated Jul. 30, 2021 for U.S. Appl. No. 16/998,464.
Office Action dated Jun. 16, 2023 for U.S. Appl. No. 17/962,957.
Notice of Allowance dated Dec. 3, 2021 for U.S. Appl. No. 16/998,464.
Notice of Allowance dated Jan. 20, 2022 for U.S. Appl. No. 16/998,464.
Notice of Allowance dated Nov. 15, 2023 for U.S. Appl. No. 17/962,957.

* cited by examiner

STATS CENTRAL PROVIDED BY EQUIBASE®

| Rank | Horse Name | 1st | 2nd | 3rd | Total Earnings | Win % |
|---|---|---|---|---|---|---|
| 1 | Forever Unbridled | 1 | 0 | 0 | $ 240,000 | 100 % |
| 2 | Karen's Silk | 2 | 0 | 0 | $ 214,830 | 70% |
| 3 | Awesome Banner | 1 | 0 | 0 | $ 183,520 | 65% |
| 4 | Sunny Ridge | 1 | 0 | 0 | $ 150,000 | 85% |
| 5 | Love Came to Town | 1 | 0 | 0 | $ 147,250 | 100 % |

FIGURE 3

METHODS OF SIMULATING GAMEPLAY

CROSS REFERENCE

This application is a Continuation of U.S. application Ser. No. 17/692,957, filed Mar. 11, 2022, which is a Continuation of U.S. application Ser. No. 16/998,464, filed Aug. 20, 2020, now U.S. Pat. No. 11,308,752, which is a Continuation of U.S. application Ser. No. 16/588,311, filed Sep. 30, 2019, now U.S. Pat. No. 10,789,804, which is a Continuation of U.S. application Ser. No. 15/685,822, filed Aug. 24, 2017, now U.S. Pat. No. 10,467,847, which claims the benefit of U.S. Provisional Application No. 62/379,917, filed Aug. 26, 2016, the contents of each of which are incorporated herein by reference in its entirety.

BACKGROUND OF THE INVENTION

Simulated video games allow players to experience and create fictional realities of real-life events, such as sporting events and other competitions. Simulated gameplay is designed to train various skills such as strategic planning, data analysis, and event prediction based on artificial standards of performance. With the advent of live broadcasting through mobile devices, simulated gameplay can be extended to sports enthusiasts and gamers worldwide.

INCORPORATION BY REFERENCE

Each patent, publication, and non-patent literature cited in the application is hereby incorporated by reference in its entirety as if each was incorporated by reference individually.

SUMMARY OF THE INVENTION

In some embodiments, the invention provides a method for electronically simulating interaction in a live event, the method comprising: a) generating a virtual representation of the live event, wherein the virtual representation comprises a group of participants, each of which corresponds to one of more participants in the live event; b) receiving an input from one or more users, wherein the user input is a modification of a state of a chosen participant in the virtual representation; c) incorporating the user input into the virtual representation; d) processing the virtual representation by a processor of a computer system to create a reasonable simulation of the live event, wherein the state of the chosen participant is based on the user input, wherein the state differs from the state that the chosen participant participated in the live event; and e) processing a wager or a non-wager submission concerning an outcome of the simulation.

In some embodiments, the invention provides a method for simulating interaction in a live event, the method comprising: a) instructing an electronic device to display a simulation of the live event, wherein the simulation comprises a group of participants, each of which corresponds to a participant in the live event, wherein the simulation comprises a modification of a state of a chosen participant; and b) receiving a prediction from a user concerning an outcome of the simulation.

In some embodiments, the invention provides a computer program product comprising a non-transitory computer-readable medium having computer-executable code encoded therein, the computer-executable code adapted to be executed to implement a method for simulating interaction of a live event, the method comprising: a) processing a gameplay simulation system, wherein the gameplay simulation system comprises: i) a event module; ii) a input module; iii) a simulation module; iv) a output module; and v) a prediction module; b) generating by the event module a virtual representation of the live event, wherein the virtual representation comprises a group of participants, each of which corresponds to a participant in the live event; c) receiving by the input module a superuser input, wherein the superuser input is a modification of a state of a chosen participant in the virtual representation; d) incorporating by the simulation module the superuser input into the virtual representation; e) processing the virtual representation by the output module to create a simulation of the live event, wherein the state of the chosen participant is based on the superuser input, wherein the state differs from the state that the chosen participant participated in the live event; and f) receiving by the prediction module a prediction from a user concerning an outcome of the simulation.

BRIEF DESCRIPTION OF THE DRAWINGS

FIG. 3 depicts an example display of the invention providing statistical information from an external source.

DETAILED DESCRIPTION OF THE INVENTION

Figure 1:
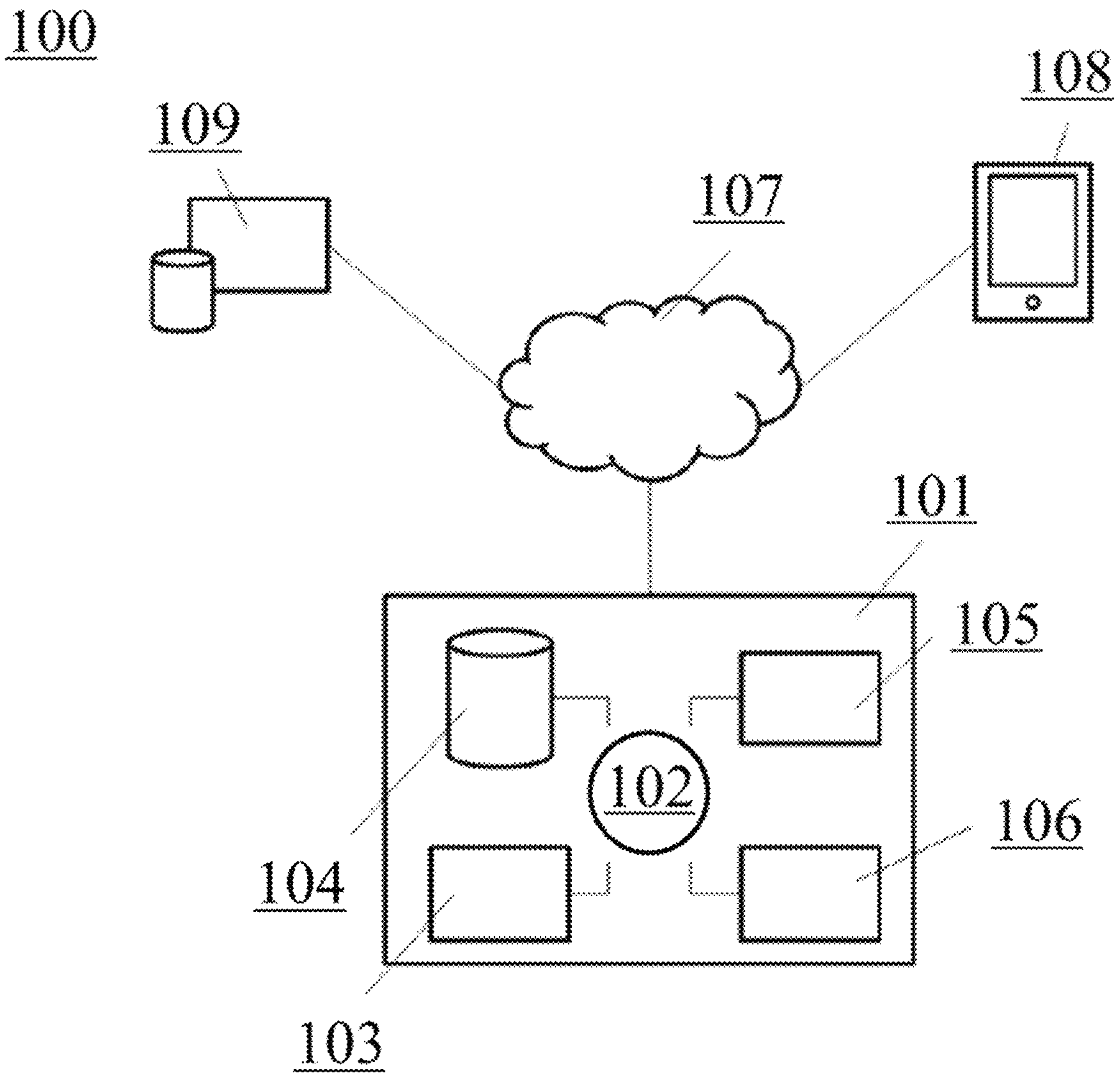
FIG. 1 illustrates a computer system for facilitating methods, systems, kits, or devices of the disclosure.

The present invention relates to simulating gameplay through a mobile environment. More specifically, the present invention relates to a system and method for simulating participation in a live event and placing wagers or making predictions on the simulated event. The method operates by incorporating input from the live event, statistics, and other information from external sources, and user input from a remote user through a network interface. These inputs are then transmitted to a computer system to process a display of the simulation, or virtual representation, of the event. Remote users can participate by placing wagers or otherwise compete by submitting a non-wager prediction concerning one or more predicted outcomes of the simulated event. After accepting all wagers or non-wager submissions, the system processes the simulated outcome and distributes winnings to respective users. In this way, the thrill of conventional sports betting is combined with the excitement of a highly interactive video game to create an additional layer of entertainment.

Sporting events can have video surveillance systems and environmental sensors that record conditions of a live event in real time. Audio, video, and other sensory inputs can provide information about a live event, which can be processed through a computer processor to generate a virtual display. For example, the live event can be a horse race.

Audio microphones and video cameras can record and electronically stream data through a network. The video footage can be transmitted to a system that generates a display of the actual positions and physical state of, for example, the horses for the duration of the race, and information from a scoreboard. Environmental sensors located at the horse race can gather additional information about the live event, including, for example, venue information, participant status information, participant position information, participant behavior information, wind velocity, temperature, date, time, atmospheric pressure, humidity, and weather conditions.

For example, in a live horse race, the condition of a race track can play an important role in the performance of the horses in the race. Generally, horses race more slowly on a wet track than on a dry track. Horses can sink into soft surfaces, thereby increasing race times. Certain horses can perform better in dirt tracks than in artificial turf tracks, or vice versa. The track condition (going) describes the track surface, for example, in terms of the surface condition, type of surface, and track configuration. The track condition can be assessed by an official steward on the day of the race. Surface condition can be influenced by, for example, type of surface, soil type if the track is dirt, type of turf if the track is artificial, surface density, porosity, compaction, and moisture content. Different classification systems can be used to assess dirt tracks and turf tracks. Artificial surfaces (all-weather tracks) can use the dirt track rating system.

Non-limiting examples of descriptions for dirt tracks can include fast: dry; even; resilient surface; wet fast (track has surface water, but base is still solid; race times are similar to or faster than a fast track); good (a track that is almost fast); muddy (a track that is wet but has no standing water); sloppy (a track saturated with water or with standing water visible); slow (a track wet on both the surface and the base); and sealed (a track surface that has been packed down). A sealed dry track can allow water to run off the track and can reduce the amount of precipitation absorbed. Wet tracks can be sealed to provide a safe and even racing surface.

Non-limiting examples of descriptions for turf tracks can include good (a turf course slightly softer than firm); yielding (a turf course with a significant amount of give to the ground due to recent rain); soft (a turf course with a large amount of moisture); and heavy (wettest possible condition of a turf course).

A computer system can receive audio, video, and other sensory data sets electronically through a source, such as a sensor located at the live event. These sensors can compile live information from the event and transmit the information across a network to one or more devices communicatively-coupled to the network. Event information generated from the audio/video footage and other sensors can then be incorporated into the simulation to enhance the reality aspect of the fictional event. As a live event proceeds, sensors can detect live information and simultaneously (or contemporaneously) transmit the information into a computer system that processes the simulation in real-time. In some embodiments, the live event and simulated event can occur simultaneously or contemporaneously. In some embodiments, the simulated event is processed after the live event concludes. In some embodiments, the information gathered from the live event is input only through a computer or computerized sensors instead of a human source. In some embodiments, an official steward can input information concerning the live event into a computer source communicately coupled to a server.

To create a simulation of a live event, sensory data sets are electronically transmitted from a live event to one or more users participating in the simulated game. In some embodiments, the simulation can be processed solely based on data sets obtained from the live event. In some embodiments, the simulation does not depend on or allow user-initiated randomness. In some embodiments, the simulation is not generated based on Bayesian inference, Bayesian probability, or any application of Bayes' theorem. In some embodiments, a game designer or a superuser can interact with variables from live event by inputting one or more modifications of the live event. The simulated game produce can be almost identical to the live event, excluding the game designer modifications. In some embodiments, a modification is a modification of a state of a chosen participant. The chosen participant can be an actual participant in the live event or an additional, virtual participant simulated by a user. The modified state can differ from the state in which the chosen participant participated in the live event according to the information gathered from the live event. The state of a chosen participant can include, for example, status information, position information, or behavior information. Status information can include, for example, whether the participant is participating in the event, for example, the removal or addition of a horse in a horse race. Position information can include, for example, the location of the participant, such as swapping the starting positions of multiple horses in a horse race. Behavior information can include, for example, specific behaviors of the participant, such as how the participant participates in the event. For example, a participant gets injured, a pitcher swaps playing positions with the shortstop, or a linebacker swaps playing positions with the quarterback. User modifications can affect the simulated performance of the participants and subsequently, can affect an outcome of the simulation. Non-limiting examples of user modifications include the removal of a chosen participant, the addition of a new participant, the replacement of a chosen participant with the new participant, and a handicap added to a chosen participant.

A game designer can have great flexibility for creating modifications, which are not limited to all possible actions taken by a coach or a participant of the live event. The game designer can create modifications for the simulation before, during, or after the live event occurs. The game designer can incorporate spontaneous, undirected events. In some embodiments, a user can modify the simulation in a manner that does not conform to reality. Such modifications can lead to simulated outcomes. For example, a participant getting injured can result in the player being ejected from a game and replaced by another participant who did not participate in the live event. For example, a participant tripping at a certain time during the game can result in loss of possession. For example, an automobile racing participant can be directed to crash into another participant, but the simulation can avoid conflict with an alternate reality.

In some embodiments, the game designer can modify conventional rules of the live event. For example, the total duration of a conventional professional basketball game is 48 minutes divided into four 12-minute quarters. A game designer can modify the duration of a simulated basketball game, for example, by reducing the duration of the game to only two 12-minute quarters or 24 minutes of total gameplay. Similarly, a conventional American football game, which lasts a total of 60 minutes divided into four 15-minute quarters, can be simulated to include an additional 15 minutes of gameplay. Also similarly, the pockets of a conventional roulette wheel are numbered from 0 to 36. A game designer can simulate the addition and/or removal of pockets, for example, by adding pockets 37, 38, 39, 40, etc. and/or by removing pockets 25-36.

In some embodiments, the game designer can assign a handicap to a chosen participant or a chosen team participating in the live event. For example, a chosen team of a soccer match could start the simulated game with 1 goal in place. For example, a chosen team of a basketball game could start the simulated game with one or more players ejected from the simulated game. In some embodiments, a user can artificially modify environmental conditions, including, for example, the weather, temperature, atmospheric pressure, humidity, wind velocity, type of track, or ground slickness. Simulated outcomes may or may not affect the overall outcome of the simulation.

In some embodiments, the game designer can specify rules of engagement, which govern the causality between a user modification and direct effect(s) of the modification. For example, the removal of a horse in a horse race can result in unoccupied space and less crowding throughout the race. An injury to a participant can result in limited playing capability relative to the location of injury. A player tripping while holding a ball in play can result in loss of possession and consequently, the opposing team gets possession of the ball. A rainstorm during a football game can result in reduced visibility and increased field slickness. Low temperatures at a baseball game can result in reduced control of the ball by the pitcher and slower velocity pitches relative to gameplay in warmer temperatures. Wind blowing towards center field in a baseball game can result in greater chances of players hitting home runs. A marathon runner getting a muscle cramp midway through a race can result in time delay. An oil slick on racecar track can result in reduced control of the vehicle.

The range of user modifications that can be processed into the simulation can be based on the context of the live event. For example, a soccer player can be ejected from a match by receiving a red card. In accordance to the conventional rules of soccer, the team must continue gameplay with one man down. The concept of a red card does not exist in other sporting events, such as American football and basketball in which an ejected player can be replaced by a new player.

In some embodiments, two types of interactions can be controlled by a game designer: (1) interactions between simulated participants; and (2) interactions between real participants and simulated participants. In some embodiments, the game designer has less flexibility in specifying rules that govern the actions between real participants and simulated participants because the live event proceeds independently of the simulated participants. Consequently, real participants from the live event cannot react to the actions of the simulated participants without deviating from reality. Nevertheless, limited forms of interaction between simulated and real participants can be incorporated into the simulation. In some embodiments, the simulated participant can assume the position of the closest real participant in the live event to avoid excessive congestion.

Instructions from the user received through the network interface are integrated with information gathered from the live event to create the simulation. The simulation can be created before, during, or after the actuation of the live event. The quantity of event information gathered live from video footage and sensors are relative to time of the initiation of the simulation. In some embodiments, the speed, the velocity, or overall performance of a live participant is fixed in the simulated event. For example, a player in a baseball game can be performing unusually poorly relative to the player's overall statistics. This information can be automatically incorporated by the computer system to simulate the outcome of the simulated event. In addition to known and/or available statistics, an additional element of unpredictability and randomness can participate that is not based on statistics and probability as in a real-life, live event.

In some embodiments, the game designer can modify the parameters used to simulate the live event to include simulated randomness. For example, external data, such as from statistics, statistical inference, Bayesian inference, or Bayesian probability, historical data, or a random simulator, can be used to simulate the outcome of the simulated event. Based on the preferences of the game designer, statistics used to simulate the event can be general, specific, or a combination thereof. For example, the simulated performance of a player can be based on overall ranking of the current year; overall performance in the particular playing venue; home field advantages or disadvantages; overall performance during a specific weather condition, temperature, or time of year; and past performance between specific rival players or rival teams. In some embodiments, the simulation can have an additional element of unpredictability and excitement for both wagerers and spectators of the simulation.

Non-limiting examples of methods to simulate randomness include a dice roller, a card shuffler, a coin toss, or a random number generator. In some embodiments, a random number generator can be used as a probability to decide and simulate an action by a participant. For example, a shot taken by a basketball player can either result in a score or a miss based on a random number probability. Similarly, a tennis volley can either result in the ball landing within bounds (ball is in play and volleying player scores) or the ball landing out of bounds (ball is out of play and receiving player scores). The combined series of random simulations results in an overall simulated outcome, for example, a winning participant or a winning team. While wagerers can make predictions on simulated outcomes based on statistical data, spontaneous events from the live event and simulated randomness can increase the difficulty of predicting a simulated outcome.

In addition to event information gathered from the live event, statistical information can be incorporated from multiple data collection sources for processing the simulated outcome of the game. Types of statistical information can include information about the sporting event, information about the participants, and information about the venue. For example, statistical information about a horse race can include the age of the horse or jockey, winning streaks of the horse or jockey, family lineage of the horse, total earnings, previous racing records, and type of track. Statistical information for a baseball game can include, for example, batting average of a player, earned run average (ERA) of a pitcher, preferred pitching styles of a player, average number of home runs in a particular baseball field, and winning records of players or teams in a particular baseball field. In some embodiments, statistical information is incorporated into the simulation when data from the live event is unknown or modified by the game designer to be unknown.

Position modifications of participants can lead to various consequences in context to the live event. For example, a user can modify the starting positions of horses in a horse race, which can be a significant factor in the winning probability of a horse. Post positions are numbered from 1 to 20, with No. 1 being on the inside rail of the track and No. 20 being the farthest outside. Unlike automobile racing where the No. 1 position is coveted, horse owners and jockeys usually prefer gates in the No. 2 to No. 10 positions.

In these positions, a horse is less likely to get pinned along the rail than in the No. 1 position, yet the horse is closer to the rail than many other horses at the first turn. Nonetheless, horses can differ in running styles, and this distinction can affect the significance of the starting position. While some horses prefer to be closer to the inside rail, others prefer to be on the outside to have more space.

In some embodiments, a user can modify playing positions of players in a baseball game. This modification can result in altered behaviors or playing capabilities that affect the winning probability of the team. For example, the user can swap the playing positions of a shortstop with the pitcher. According to player statistics, the players can have very little to very much experience playing opposite positions, and this experience can dictate the defensive or offensive advantage of the team.

The simulation can exhibit a standard of performance that differs from the standard of performance of the real-life event. The resulting simulation can have altered circumstances and altered winning probabilities, and can lead to altered outcomes. Players can assess various factors and statistical information that contribute to the simulated outcome to increase their chances of winning.

The live event can be a sporting event including, for example, basketball, American football, rugby, soccer, golf, hockey, handball, baseball, softball, cricket, tennis, squash, badminton, table tennis, volleyball, polo, water polo, billiards, and bowling. The live event can be a racing competition including, for example, running, automobile racing, horse racing, rowing, skiing, speed skating, swimming, and cycling. The racing competition can be a mixed discipline event, including, for example, biathlons, triathlons, pentathlons, heptathlons, and decathlons. The live event can be a combat sporting event including, for example, fencing, judo, jiu-jitsu, wrestling, boxing, karate, kung fu, muay thai, taekwondo, and mixed martial arts. The live event can be a gambling event including, for example, blackjack, poker, baccarat, roulette, and craps. The live event can be a strategic gaming event including, for example, chess. The live sporting event can take place during regular season gameplay, interleague gameplay, or during special events, such as the Super Bowl® and the Olympic Games®.

The present invention not only allows users to interact with the live event to design a simulated event, but also allows users to create wagering and non-wagering opportunities for the simulated event. After the simulated event has been created and transmitted to the network, users can view simulations that are available for wagering or submitting non-wager predictions. To promote wide participation in the wagering event or non-wager game, the game designer can set an allotted time for placing wagers or non-wager submissions. Wagers can be placed on the general pot in which users wager on or choose the winner of the simulated outcome.

Alternatively, wagers or non-wager submissions can be placed in the form of side bets in which a user directly proposes a wager with another user or a head-to-head competition in a non-wager game. As wagers are placed, the system maintains a record of all bets and debits user accounts accordingly. As non-wager submissions are submitted, the system maintains a record of all submissions from user accounts accordingly. After the wagering or non-wagering deadline has been reached, the system processes the simulated outcome by incorporating event inputs, user inputs, and statistical information compiled from multiple external sources. The system then transmits the results to users through the network and credits winnings or game points to user accounts. The betting proposals, responses, and simulated outcome can be encrypted to prevent eavesdropping.

Wagers and non-wager submissions are not limited to betting on or choosing the winner of the match, or other fixed-odds, money-line wagers. Various types of wagers can be placed on the simulated event including, for example, straight bets and totals. In straight bets, wagerers pick in advance which team will win the game. In totals, wagerers bet on the total points scored, such as whether is it higher or lower than the posted total. In some embodiments, wagers can be made on a point spread based on predetermined statistics evaluated by a bookmaker. In a point spread, a handicap is placed on the superior team. For example, if Team A is favored by 10 points over Team B, the point spread is 10. Team A must win the game by more than 10 points for a wagerer on Team A to win, while those betting on Team B win if Team B wins the game or losses by less than 10 points. In some embodiments, the system can accept parlay wagers in which multiple simulated games are all placed into a single bet. In some embodiments, users can make proposition wagers or non-wager predictions on specific sub-outcomes, which do not directly affect the game's final outcome, for example, wagering on the number of balls or strikes thrown by a baseball pitcher, wagering on the number of points scored by an individual basketball player, or wagering on which team scores first in a match.

Wagers and non-wager submissions can be made on various aspects of the simulated outcome. For example, users can make more complex wagers and non-wager submissions associated with a particular event. In some embodiments, the system can accept, for example, quinella, exacta, trifecta, and superfecta bets in horse race simulations. In some embodiments, wagers and non-wager submissions can be made on an accomplishment by a participant of the simulation. An accomplishment can include, for example, hitting a home run, getting a first down, completing a race at a specific time, and the number of points or field goal percentage in a basketball game.

EXAMPLES

Example 1. Computer Architectures

An aspect of the disclosure provides a system that is programmed or otherwise configured to implement the methods of the disclosure. The system can include a computer server that is operatively coupled to an electronic device of a user including, for example, a simulation creator, a wagerer, or a gamer.

FIG. 1 shows a computer system 100 programmed or otherwise configured to allow, for example, a user to view a live event and add a modification to said live event to create a simulation. The system 100 includes a computer server ("server") 101 that is programmed to implement methods disclosed herein. The server 101 includes a central processing unit (CPU) 102, which can be a single core or multi-core processor, or a plurality of processors for parallel processing. The server 101 also includes: memory 103, such as random-access memory, read-only memory, and flash memory; electronic storage unit 104, such as a hard disk; communication interface 105, such as a network adapter, for communicating with one or more other systems; and peripheral devices 106, such as cache, other memory, data storage and electronic display adapters. The memory 103, storage unit 104, interface 105 and peripheral devices 106 are in communication with the CPU 102 through a communication bus, such as a motherboard. The storage unit 104 can be a data storage unit or data repository for storing data. The server 101 can be operatively coupled to a computer network 107 with the aid of the communication interface 105. The network 107 can be the Internet, an internet or extranet, or an intranet or extranet that is in communication with the Internet. The network 107 in some cases is a telecommunications network or data network. The network 107 can include one or more computer servers, which can allow distributed computing, such as cloud computing. The network 107, in some cases with the aid of the server 101, can implement a peer-to-peer network, which can allow devices coupled to the server 101 to behave as a client or an independent server.

The storage unit 104 can store files, such as drivers, libraries, saved programs, and clinical data related to a subject. The storage unit 104 can store simulation data from, for example, live event scoreboards, live event statistics, and history of simulated events. The storage unit 104 can store user data, such as user profile, user accounting information, and user statistics. The server 101 in some cases can include one or more additional data storage units that are external to the server 101, such as located on a remote server that is in communication with the server 101 through an intranet or the Internet.

The server 101 can communicate with one or more remote computer systems through the network 107. In some embodiments, the server 101 is in communication with a first computer system 108 and a second computer system 109 that are located remotely with respect to the server 101. The first computer system 108 can be the computer system of a user, and the second computer system 109 can be an external data repository. The first computer system 108 and second computer system 109 can be, for example, personal computers, such as a portable PC; slate and tablet PC, such as Apple® iPad and Samsung® Galaxy Tab; telephones; smartphones, such as Apple® iPhone, Android-enabled device, Windows® Phone, and Blackberry®; smart watches, such as Apple® Watch; smart glasses, such as Google® Glass; or personal digital assistants. The user can access the server 101 via the network 107 to view a display of the invention.

In some embodiments, the system 100 includes a single server 101. In other situations, the system 100 includes multiple servers in communication with one another through an intranet or the Internet. The server 101 can be adapted to store event information, such as, for example, statistical data, video footage, external conditions, and other information of potential relevance to the event. Such event information can be stored on the storage unit 104 of the server 101.

Methods as described herein can be implemented by way of a machine- or computer-executable code or software stored on an electronic storage location of the server 101, such as, for example, on the memory 103 or electronic storage unit 104. During use, the code can be executed by the processor 102. In some embodiments, the code can be retrieved from the storage unit 104 and stored on the memory 103 for ready access by the processor 102. In some embodiments, the electronic storage unit 104 can be precluded, and machine-executable instructions are stored on memory 103. Alternatively, the code can be executed on the second computer system 109. The code can be pre-compiled and configured for use with a processor adapted to execute the code, or can be compiled during runtime. The code can be supplied in a programming language that can be selected to allow the code to execute in a precompiled or as-compiled fashion.

All or portions of the software can at times be communicated through the Internet or various other telecommunications networks. Such communications can support loading of the software from one computer or processor into another, for example, from a management server or host computer into the computer platform of an application server. Another type of media that can bear the software elements includes optical, electrical, and electromagnetic waves, such as those used across physical interfaces between local devices, through wired and optical landline networks and over various air-links. The physical elements that carry such waves, such as wired or wireless links, or optical links, also can be considered as media bearing the software.

A machine-readable medium, incorporating computer-executable code, can take many forms, including a tangible storage medium, a carrier wave medium, and physical transmission medium. Non-limiting examples of non-volatile storage media include optical disks and magnetic disks, such as any of the storage devices in any computer, such as can be used to implement the databases of FIG. 1. Volatile storage media include dynamic memory, such as a main memory of such a computer platform. Tangible transmission media include coaxial cables, copper wire, and fiber optics, including wires that comprise a bus within a computer system. Carrier-wave transmission media can take the form of electric or electromagnetic signals, or acoustic or light waves such as those generated during radio frequency (RF) and infrared (IR) data communications.

Common forms of computer-readable media include: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, and any other medium from which a computer can read programming code or data. Many of these forms of computer readable media can be involved in carrying one or more sequences of one or more instructions to a processor for execution.

The server 101 can be configured for: data mining; extract, transform and load (ETL); or spidering operations, including Web Spidering where the system retrieves data from remote systems over a network and access an Application Programming Interface or parses the resulting markup, which can permit the system to load information from a raw data source or mined data into a data warehouse. The data warehouse can be configured for use with a business intelligence system, such as Microstrategy® and Business Objects®. The system can include a data mining module adapted to search for media items in various source locations, such as email accounts and various network sources, such as social networking accounts, such as Facebook®, Foursquare®, Google+®, and Linkedin®, or on publisher websites, such as weblogs.

Computer software can include computer programs, such as, for example executable files, libraries, and scripts. Software can include defined instructions that upon execution instruct computer hardware, for example, an electronic display to perform various tasks, such as display graphical elements on an electronic display. Software can be stored in computer memory.

Software can include machine-executable code. Machine-executable code can include machine language instructions specific to an individual computer processor, such as a CPU. Machine language can include groups of binary values signifying processor instructions that change the state of an electronic device, for example, a computer, from its preceding state. For example, an instruction can change the value stored in a particular storage location inside the computer. An instruction may also cause an output to be presented to a user, such as graphical elements to appear on an electronic display of a computer system. The processor can carry out the instructions in the order they are provided.

Software comprising one or more lines of code and their output(s) can be presented to a user on a user interface (UI) of an electronic device of the user. Non-limiting examples of UIs include a graphical subject interface (GUI) and web-based subject interface. A GUI can allow a subject to access a display of the invention. The UI, such as GUI, can be provided on a display of an electronic device of the subject. The display can be a capacitive or resistive touch display, or a head-mountable display, such as a Google® Glass. Such displays can be used with other systems and methods of the disclosure.

Methods of the disclosure can be facilitated with the aid of applications, or apps, which can be installed on an electronic device of the subject. An app can include a GUI on a display of the electronic device of the subject. The app can be programmed or otherwise configured to perform various functions of the system. GUIs of apps can display on an electronic device of the subject. Non-limiting examples of electronic devices include computers, televisions, smartphones, tablets, and smart watches. The electronic device can include, for example, a passive screen, a capacitive touch screen, or a resistive touch screen. The electronic device can include a network interface and a browser that allows the subject to access various sites or locations, such as web sites, on an intranet or the Internet. The app is configured to allow the mobile device to communicate with a server, such as the server 101.

Any embodiment of the invention described herein can be, for example, produced and transmitted by a user within the same geographical location. A product of the invention can be, for example, produced and/or transmitted from a geographic location in one country and a user of the invention can be present in a different country. In some embodiments, the data accessed by a system of the invention is a computer program product that can be transmitted from one of a plurality of geographic locations to a user. Data generated by a computer program product of the invention can be transmitted back and forth among a plurality of geographic locations, for example, by a network, a secure network, an insecure network, an internet, or an intranet. In some embodiments, a system herein is encoded on a physical and tangible product.

Example 2. Simulated Horse Race

Figure 2:
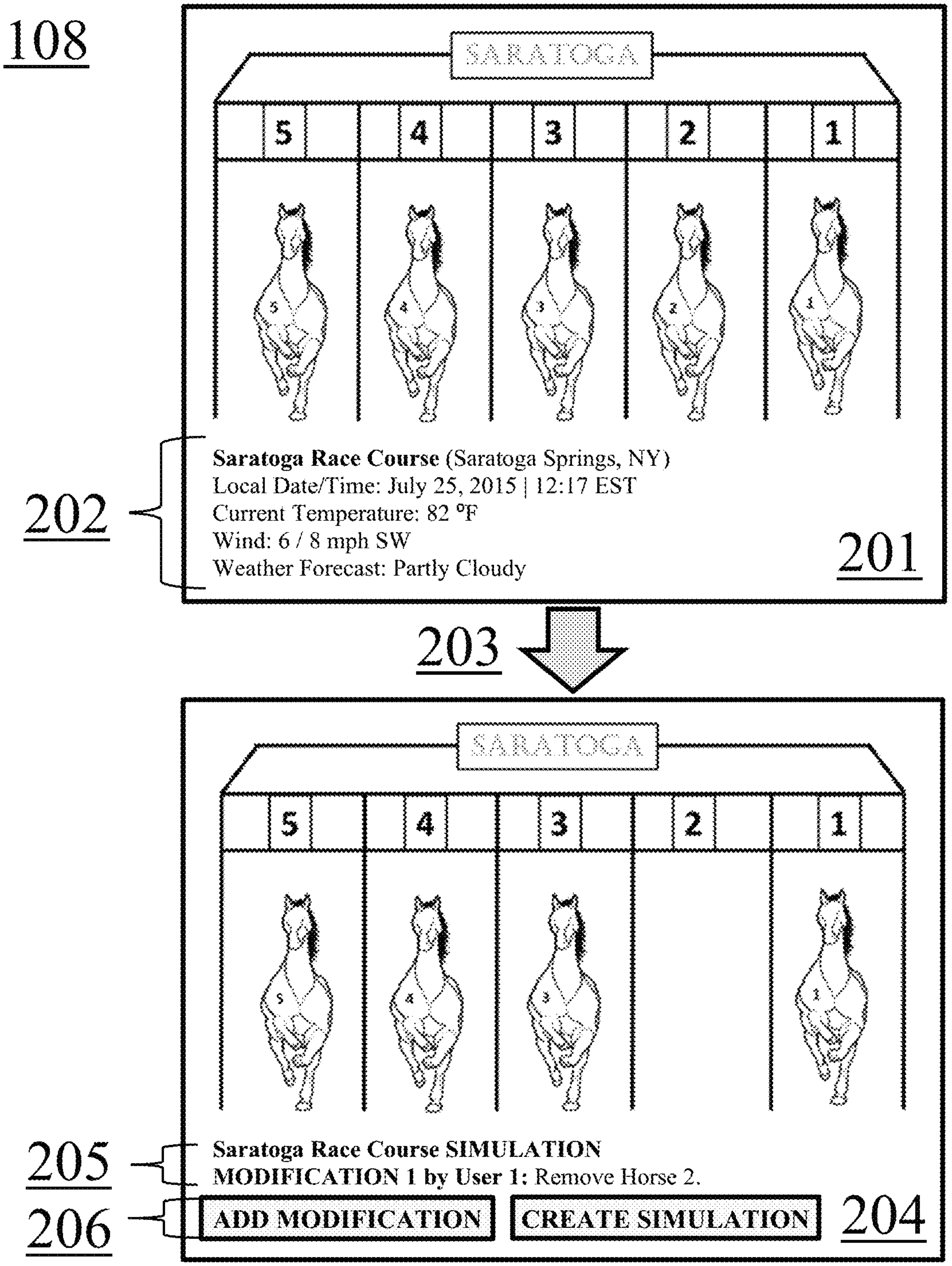
FIG. 2 depicts an example display of the invention showing a real-time footage of live event in parallel to a simulated event.

FIG. 2 depicts an example display of information viewable on a first computer system 108 generated from a live event 201, a horse race taking place in Saratoga Racetrack. The video footage display of the live event 201 shows participants at the starting gate at a specific date and time. Video footage can be displayed either live or by playback mode dependent on whether user actuation occurs before, during, or after the actual horse race. Data transmitted from environmental sensors and video footage are collectively considered as event information 202. Event information 202 includes external factors of the live sporting event, such as location, date, time, temperature, wind velocity, atmospheric pressure, humidity, and weather forecast. After acknowledgment of event information 202 of live event 201 by a user, one or more modifications, known as user input 203, can be added to create a simulated event 204. A computer system executes a modification 205, for example, the removal of horse 2 from the race by User 1, and a virtual representation of the simulated event 204 is displayed. As the game designer, User 1 can subsequently create additional modifications 205 or simulate the event by selecting respective user commands 206. After the simulated event 204 is created, remote users, including the game designer, can place wagers or non-wager submissions on the simulation through mobile devices connected through the network.

FIG. 3 displays statistical data about the participating horses including, for example, overall rankings, total earnings, win percentages, or the age of the horse. For example, statistical information can be transmitted from external data collection sources 402, such as Equibase®.

Figure 4:
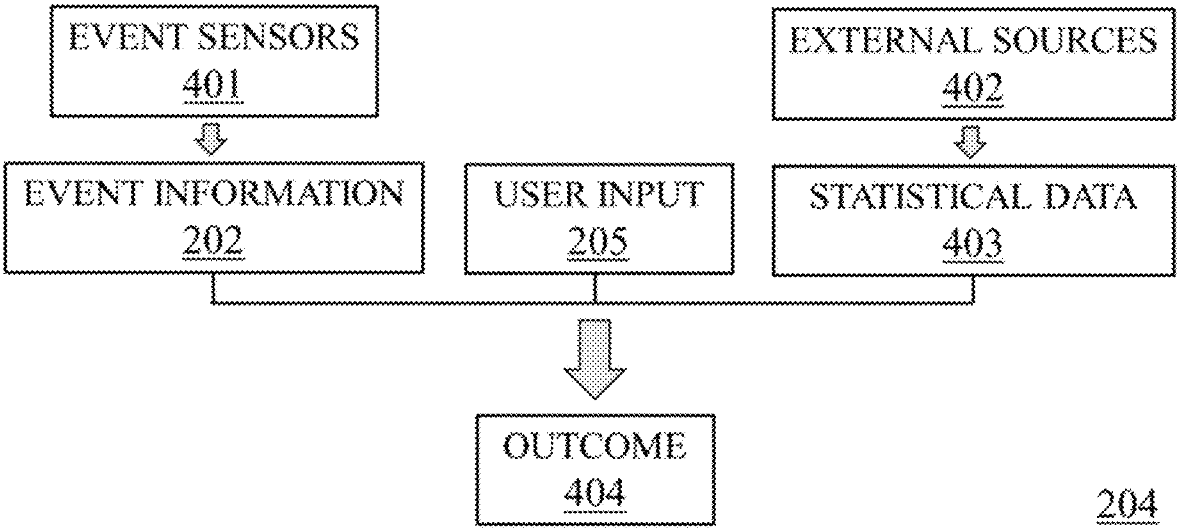
FIG. 4 illustrates an example sequence of steps by which the system creates a simulation based on event inputs, statistical data, and user inputs.

Example 3. Functional Block Diagram of a System for Creating Simulated Gameplay FIG. 4 illustrates a sequence of example steps in which the system 100 creates simulated event 204. Event sensors 401 located at the live event process event information 202, while statistical data 403 are processed from external data collection sources 402, such as the example shown in FIG. 3. After processing event information 202 and statistical data 403, the system 100 executes user input 205 to create simulated outcome 404.

Figure 5:
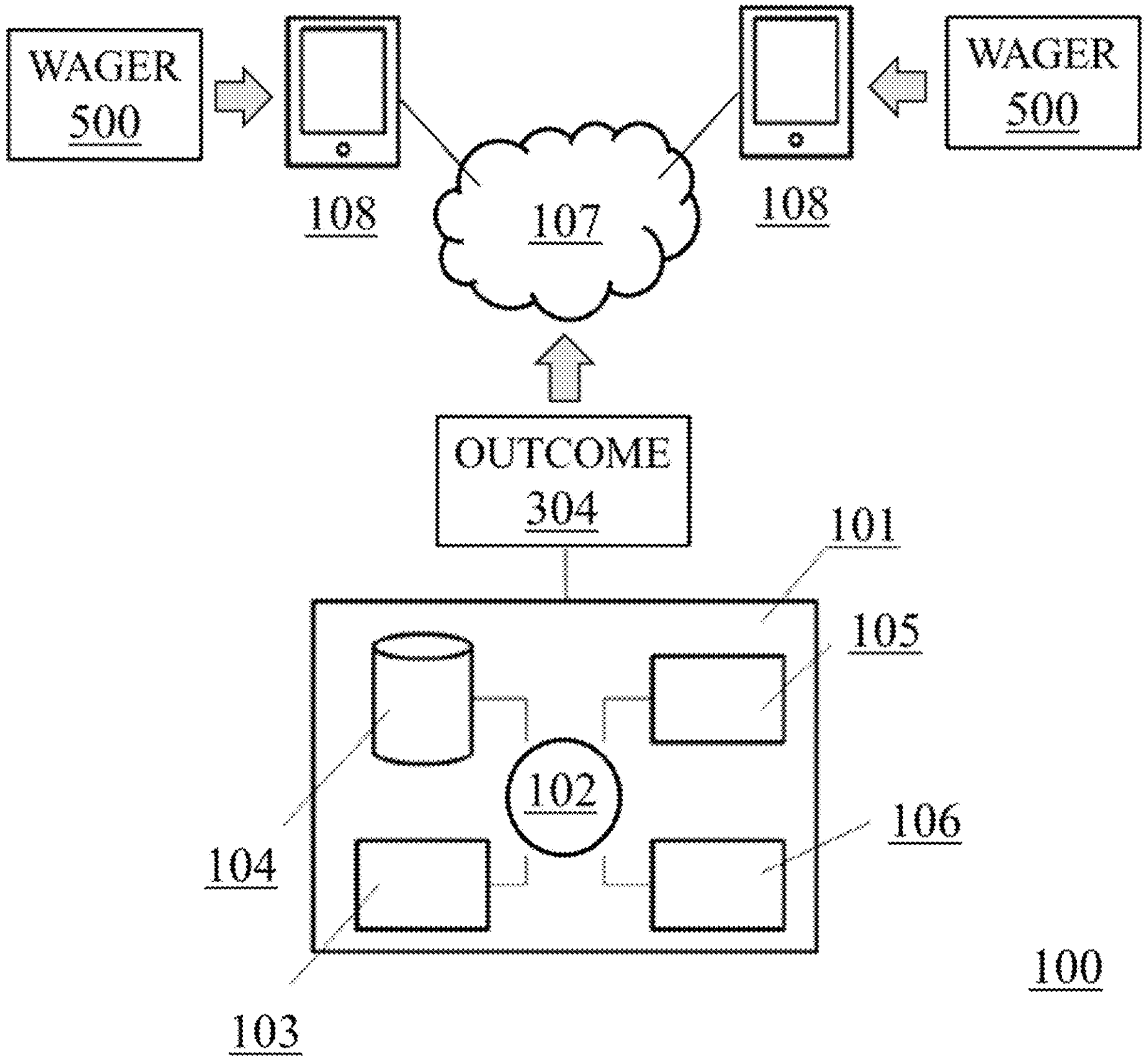
FIG. 5 illustrates an example computer system for processing wagers or non-wager submissions, processing simulated outcome, and distributing winnings.
Figure 6:
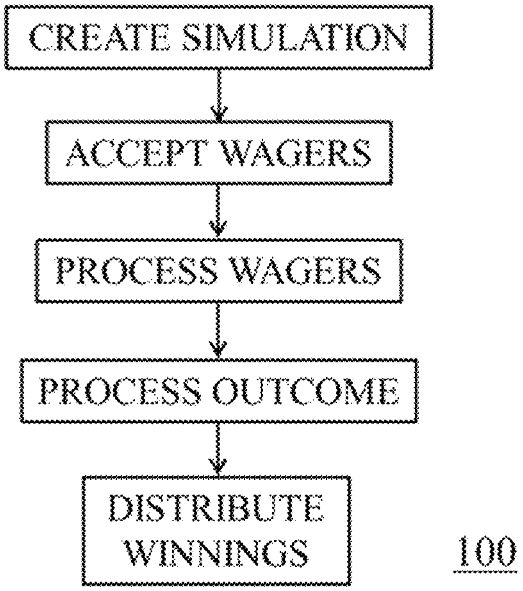
FIG. 6 illustrates an example sequence of steps by which the system processes wagers or non-wager submissions, and distributes winnings.

Example 4. Functional Block Diagram of a System for Processing Wagers and Distributing Winnings FIG. 5 shows a computer system 100 programmed or otherwise configured to allow a plurality of users to place wagers 500 on a simulated event and receive winnings based on the results of the simulated outcome processed by system 100 and transmitted through network 107 from a plurality of first computer systems 108. FIG. 6 illustrates a sequence of steps in which system 100 creates and processes simulated game play through network 107. System 100 creates the simulated event, accepts wagers, processes wagers, processes the simulated outcome, and distributes winnings to respective users.

EMBODIMENTS

Embodiment 1. A method for electronically simulating interaction in a live event, the method comprising: a) generating a virtual representation of the live event, wherein the virtual representation comprises a group of participants, each of which corresponds to a participant in the live event; b) receiving an input from a superuser, wherein the superuser input is a modification of a state of a chosen participant in the virtual representation; c) incorporating the superuser input into the virtual representation; d) processing the virtual representation by a processor of a computer system to create a simulation of the live event, wherein the state of the chosen participant is based on the superuser input, wherein the state differs from the state that the chosen participant participated in the live event; and e) receiving a prediction from a user from a group of users concerning an outcome of the simulation.

Embodiment 2. The method of embodiment 1, further comprising electronically displaying the virtual representation of the live event.

Embodiment 3. The method of embodiment 1 or 2, wherein the state is status information.

Embodiment 4. The method of any one of embodiments 1-3, wherein the state is position information.

Embodiment 5. The method of any one of embodiments 1-4, wherein the state is behavior information.

Embodiment 6. The method of any one of embodiments 1-5, further comprising receiving an event input from a source located at the live event, and incorporating the event input into the simulation.

Embodiment 7. The method of embodiment 6, wherein the event input is an environmental condition.

Embodiment 8. The method of embodiment 7, wherein the environmental condition is a weather condition.

Embodiment 9. The method of any one of embodiments 6-8, wherein the event input includes the state of each participant in the live event.

Embodiment 10. The method of any one of embodiments 6-9, wherein the event input further includes statistical information of participants in the live event.

Embodiment 11. The method of any one of embodiments 1-10, further comprising calculating a probability of the outcome of the simulation.

Embodiment 12. The method of any one of embodiments 1-11, wherein the live event is a sporting event.

Embodiment 13. The method of embodiment 12, wherein the sporting event is a horse race.

Embodiment 14. The method of any one of embodiments 1-13, wherein the user is the superuser.

Embodiment 15. The method of any one of embodiments 1-14, further comprising processing a wager from the user concerning the outcome of the simulation.

Embodiment 16. The method of any one of embodiments 1-15, further comprising processing a non-wager submission from the user concerning the outcome of the simulation.

Embodiment 17. The method of any one of embodiments 1-16, wherein the outcome is the winner of the simulation.

Embodiment 18. The method of any one of embodiments 1-17, wherein the outcome is an accomplishment of a participant of the simulation.

Embodiment 19. A method for simulating interaction in a live event, the method comprising: a) instructing an electronic device to display a simulation of the live event, wherein the simulation comprises a group of participants, each of which corresponds to a participant in the live event, wherein the simulation comprises a modification of a state of a chosen participant; and b) receiving a prediction from a user from a group of users concerning an outcome of the simulation.

Embodiment 20. The method of embodiment 19, further comprising inputting the modification of the state of the chosen participant.

Embodiment 21. The method of embodiment 19 or 20, wherein the modification of the state of the chosen participant is removal of the chosen participant, addition of a new participant, or replacement of the chosen participant with the new participant.

Embodiment 22. The method of any one of embodiments 19-21, further comprising transmitting the simulation to the user from the group of users after each user of the group submits the prediction concerning the outcome of the simulation.

Embodiment 23. The method of any one of embodiments 19-22, wherein the state is status information.

Embodiment 24. The method of any one of embodiments 19-23, wherein the state is position information.

Embodiment 25. The method of any one of embodiments 19-24, wherein the state is behavior information.

Embodiment 26. The method of any one of embodiments 19-25, further comprising instructing the electronic device to display an event input obtained from a source located at the live event, incorporating the event input into the simulation of the live event, and calculating a probability of the outcome of the simulation.

Embodiment 27. The method of embodiment 26, wherein the event input is an environmental condition.

Embodiment 28. The method of embodiment 27, wherein the environmental condition is a weather condition.

Embodiment 29. The method of any one of embodiments 26-28, wherein the event input includes the state of each participant in the live event.

Embodiment 30. The method of any one of embodiments 26-29, wherein the event input includes statistical information of participants in the live event.

Embodiment 31. The method of any one of embodiments 19-30, further comprising processing a wager from the user concerning the outcome of the simulation.

Embodiment 32. The method of any one of embodiments 19-31, further comprising processing a non-wager submission from the user concerning the outcome of the simulation.

Embodiment 33. The method of any one of embodiments 19-32, wherein the outcome is the winner of the simulation.

Embodiment 34. The method of any one of embodiments 19-33, wherein the outcome is an accomplishment of a participant of the simulation.

Embodiment 35. A computer program product comprising a non-transitory computer-readable medium having computer-executable code encoded therein, the computer-executable code adapted to be executed to implement a method for simulating interaction of a live event, the method comprising: a) processing a gameplay simulation system, wherein the gameplay simulation system comprises: i) a event module; ii) a input module; iii) a simulation module; iv) a output module; and v) a prediction module; b) generating by the event module a virtual representation of the live event, wherein the virtual representation comprises a group of participants, each of which corresponds to a participant in the live event; c) receiving by the input module a superuser input, wherein the superuser input is a modification of a state of a chosen participant in the virtual representation; d) incorporating by the simulation module the superuser input into the virtual representation; e) processing the virtual representation by the output module to create a simulation of the live event, wherein the state of the chosen participant is based on the superuser input, wherein the state differs from the state that the chosen participant participated in the live event; and f) receiving by the prediction module a prediction from a user from a group of users concerning an outcome of the simulation.

Embodiment 36. The computer program product of embodiment 35, wherein the gameplay simulation system further comprises a display module, wherein the display module displays by a virtual representation of the live event.

Embodiment 37. The computer program product of embodiment 35 or 36, wherein the state is status information.

Embodiment 38. The computer program product of any one of embodiments 35-37, wherein the state is position information.

Embodiment 39. The computer program product of any one of embodiments 35-38, wherein the state is behavior information.

Embodiment 40. The computer program product of any one of embodiments 35-39, wherein the method further comprises receiving by the input module an event input from a source located at the live event, and incorporating by the simulation module the event input into the virtual representation.

Embodiment 41. The computer program product of embodiment 40, wherein the event input is an environmental condition.

Embodiment 42. The computer program product of embodiment 41, wherein the environmental condition is a weather condition.

Embodiment 43. The computer program product of any one of embodiments 40-42, wherein the event input includes the state of each participant in the live event.

Embodiment 44. The computer program product of any one of embodiments 40-43, wherein the event input includes statistical information of participants in the live event.

Embodiment 45. The computer program product of any one of embodiments 35-44, wherein the live event is a sporting event.

Embodiment 46. The computer program product of embodiment 45, wherein the sporting event is a horse race.

Embodiment 47. The computer program product of any one of embodiments 35-46, wherein the user is the superuser.

Embodiment 48. The computer program product of any one of embodiments 35-47, wherein the gameplay simulation system further comprises a wager module, wherein the wager module processes a wager from the user concerning the outcome of the simulation.

Embodiment 49. The computer program product of any one of embodiments 35-48, wherein the gameplay simulation system further comprises a submission module, wherein the submission module processes a non-wager submission from the user concerning the outcome of the simulation.

Embodiment 50. The computer program product of any one of embodiments 35-49, wherein the outcome is the winner of the simulation.

Embodiment 51. The computer program product of any one of embodiments 35-50, wherein the outcome is an accomplishment of a participant of the simulation.

What is claimed is:

1. A computer implemented method for electronically simulating interaction in a virtual representation of a live event, the method comprising:

a) a user observing an electronic display of the virtual representation of the live event; and b) the user submitting an input to be incorporated by a computer processor into the virtual representation to generate a simulated outcome, wherein the input is a modification of a parameter in the virtual representation, wherein the parameter in the virtual representation differs from the parameter in the live event.

2. The method of claim 1, wherein the virtual representation comprises a participant that corresponds to a real participant in the live event.

3. The method of claim 1, wherein the virtual representation comprises a group of participants, each of which corresponds to a participant in the live event.

4. The method of claim 1, wherein the virtual representation comprises a simulated participant that does not correspond to a real participant in the live event.

5. The method of claim 1, wherein the parameter comprises a condition in the live event.

6. The method of claim 5, wherein the condition comprises an environmental condition in the live event.

7. The method of claim 1, wherein the parameter comprises a state of a participant in the live event.

8. The method of claim 1, wherein the parameter comprises a rule of the live event.

9. The method of claim 1, wherein the simulated outcome is an accomplishment of a participant of the virtual representation.

10. The method of claim 1, wherein the generating of the stimulated outcome occurs contemporaneously to actuation of the live event.

11. The method of claim 1, wherein the generating of the stimulated outcome occurs before actuation of the live event.

12. The method of claim 1, wherein the generating of the stimulated outcome occurs after actuation of the live event.

13. The method of claim 1, wherein the simulated outcome is generated based on statistical information of past performance of participants of the live event.

14. The method of claim 1, wherein the simulated outcome is generated based on a calculated probability.

15. The method of claim 1, wherein the simulated outcome is generated based on Bayesian inference.

16. The method of claim 1, wherein the simulated outcome is generated based on randomness.

17. The method of claim 1, further comprising modifying interactions between participants in the virtual representation.

18. The method of claim 17, wherein the interactions are between simulated participants in the virtual representation.

19. The method of claim 17, wherein the interactions comprise interactions between real and simulated participants in the virtual representation.

20. The method of claim 1, further comprising electronically receiving the virtual representation of the live event.

21. The method of claim 1, further comprising the user submitting a prediction concerning the simulated outcome.

22. The method of claim 21, wherein the user is a player.

23. The method of claim 1, further comprising the user proposing to a player a wager concerning the simulated outcome.

* * * * *